April 22, 1958

T. O. LILLQUIST 2,831,464

FLUID PRESSURE MOTOR

Filed Feb. 19, 1954

INVENTOR
Torsten O. Lillquist
BY
S. C. Thorpe
ATTORNEY

United States Patent Office 2,831,464
Patented Apr. 22, 1958

2,831,464

FLUID PRESSURE MOTOR

Torsten O. Lillquist, La Grange Park, Ill., assignor to General Motors Corporation, Detroit, Mich., a corporation of Delaware Application February 19, 1954, Serial No. 411,427

1 Claim. (Cl. 121—38)

This invention relates generally to control means and more particularly to a unique servomotor which, because of its unusual construction and operation, is highly adaptable for use in electrical control transition schemes of the type normally found on diesel electric locomotives. For this reason this servomotor will be described in connection with such a transition control scheme.

It is well known that in a diesel locomotive the transmission for transmitting the power from the prime mover to the wheels comprises a main generator and a plurality of traction motors adapted to be connected in different electrical relationships thereacross. These traction motors are usually connected in series in sets of two across the main generator and then as the locomotive increases in speed and the back voltages of the motors increase to a point where the locomotive can no longer accelerate, the motors are then reconnected in parallel across the generator.

Before connecting the motors in parallel across the generator an intermediate step is sometimes used in which the fields of the traction motors are shunted to decrease motor back voltage and in this way allow the locomotive to further accelerate. The means for achieving these different electrical combinations of the traction motors across the main generator has always received considerable attention and, in the past, it has been necessary to provide very elaborate switching means as well as a plurality of pneumatic devices in order to make the different connections.

One of the purposes of this invention is to provide a single servomotor which by having a plurality of operating positions may be readily utilized to connect the traction motors across the generator in different electrical combinations to thereby achieve the aforementioned transition control.

For a further understanding of this servo control and the operating features thereof, reference may be had to the accompanying detailed description and the drawings, in which.

Figure 1:
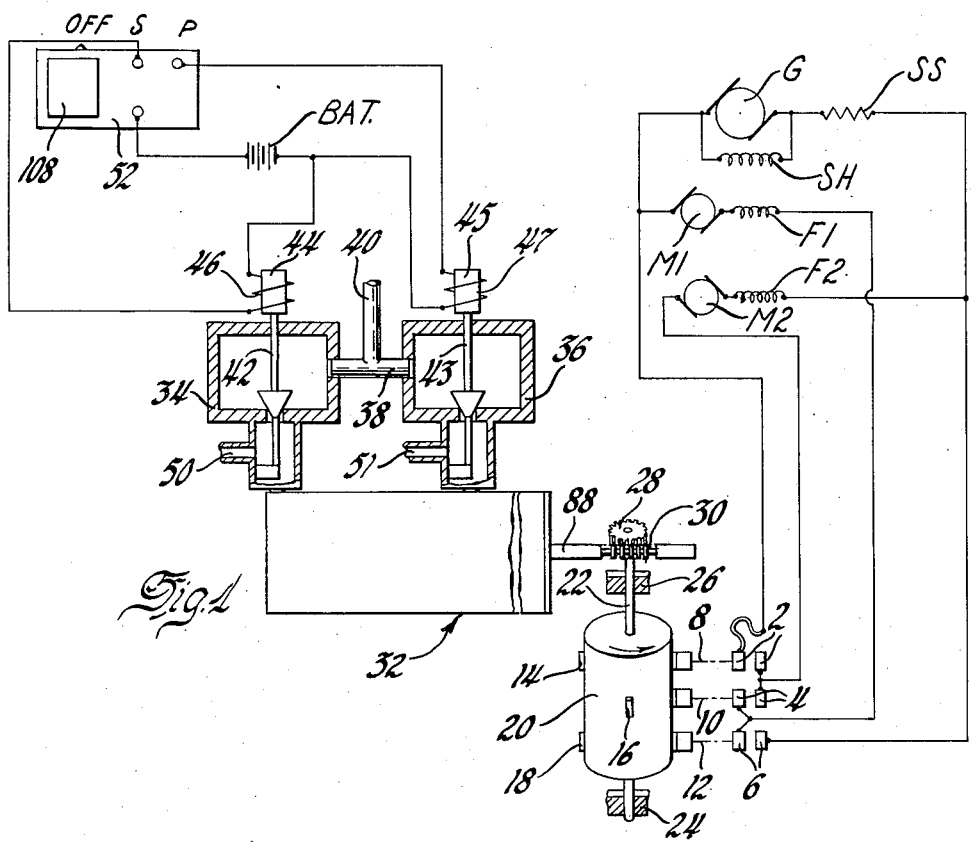
Fig. 1 represents a schematic diagram illustrating the transition control with the new servomotor incorporated therein.

Referring now to Fig. 1, a main generator G is shown having the usual exciting fields SS and SH. The generator G is normally driven by a diesel engine (not shown). Adapted to be connected across the main generator in different electrical relationships are a pair of traction motors M1 and M2 having exciting fields F1 and F2, respectively. These motors are normally connected to driving axle and wheel sets which provide the motive power for propelling the locomotive along the rails. It will be noted that one side of each motor is connected to an opposite side of the generator G and that the other sides of these motors are connected to a plurality of switching contacts 2, 4, and 6 which, when closed in different operating combinations, serve to connect the motors in either series or parallel relationship across the generator G. The contacts 2, 4, and 6 are provided with operating links 8, 10, and 12, respectively, which, in turn, are controlled by a plurality of lobes 14, 16, and 18 on a drum 20. The drum 20 is rotatable back and forth with a shaft 22 supported by a pair of bearing supports 24 and 26. The upper end of the shaft 22 is provided with a small pinion 28 having teeth in meshing relation with the teeth of a rack 30. The rack 30 represents the operating means 88 of the new servomotor, indicated generally by a numeral 32.

A pair of air magnet valve assemblies 34 and 36 are connected to the servomotor 32 and are also adapted to be connected to a suitable air pressure source by means of piping 38 and 40. The air magnet valve assemblies 34, 36 are solenoid operated and include normally seated valves 42, 43 attached to magnetic cores 44, 45, respectively. The valve assemblies 34, 36 are provided with energizing windings 46, 47, respectively, which, when energized, unseat the valves 42, 43 to allow air to enter the servomotor 32 and at the same time cover ports 50, 51, normally connecting the servomotor 32 to atmosphere. A voltage source BAT is provided for energization of the windings 46 and may be connected by means of a switch 52 to energize one or both of the air magnet valve assemblies 34 and 36.

Figure 2:
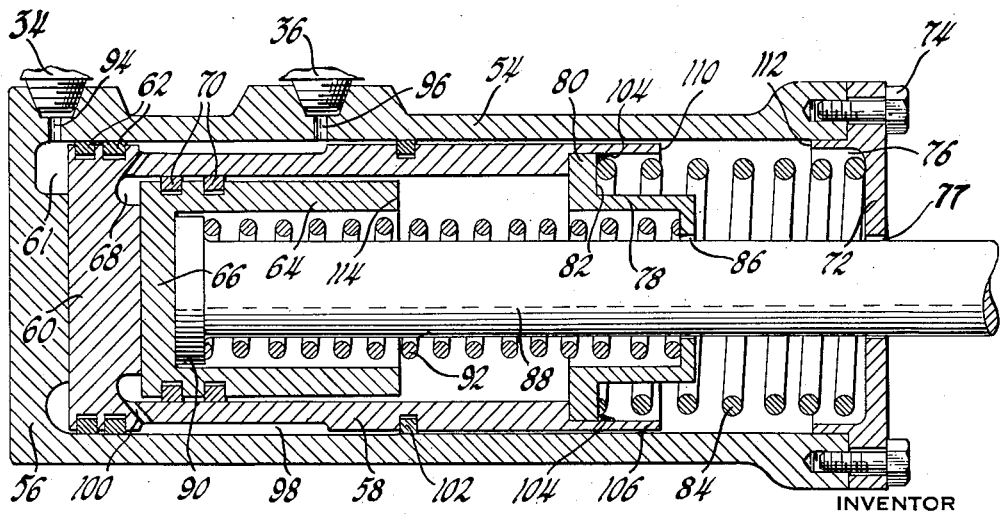
Fig. 2 is an enlarged view of the servomotor in section showing the unique details thereof.

Referring now to Fig. 2, the new servomotor, indicated by the numeral 32 in Fig. 1, comprises a cylindrical housing 54 having a closed end 56. Located in the cylinder 54 is a hollow piston 58 having a closed end 60 normally abutting the closed end 56 of the cylinder 54 and forming an expansible chamber 61 therewith. The closed end 60 of the piston 58 is provided with lands and grooves in which a pair of sealing piston rings 62 reside. Telescoped in the hollow piston 58 is a second hollow piston 64 having a closed end 66 normally abutting the closed end 60 of piston 58 and forming an expansible chamber 68 therewith. The piston 64 is provided with lands and grooves in which a pair of sealing piston rings 70 reside.

The cylindrical housing 54 is provided with a detachable cover plate 72 secured to its open end by a plurality of bolts 74. Cover plate 72 has a spring seat 76 formed therein which when secured to the cylinder 54 faces the closed end 56 thereof. An opening 77 is provided in the center of the cover plate 72. The open end of the piston 58 has a cupped member 78 recessed therein which is provided with an upper lip 80. The underside 82 of lip 80 forms a spring seat facing spring seat 76 on the cover plate 72. Interposed between and engaging the underside 82 of lip 80 and the spring seat 76 is a helical coil spring 84 which normally urges the lip 80 against the open end of the piston 58 and also urges the closed end 60 of piston 58 against the closed end 56 of the cylinder 54. It will be noted that the cupped member 78 is also provided with a central opening 86 in the bottom thereof which is in alignment with the opening 78. Extending through the openings 77 and 86 is an operating rod 88 having a flange 90 thereon adjacent the inner surface of the closed end 66 of the piston 64. Interposed between the flange 90 and the inner surface of the bottom of cup member 78 is a second helical coil spring 92 which normally urges the flange 90 of the operating rod 88 against the inner surface of the closed end 66 of piston 64 and also urges the closed end 66 of piston 64 against the closed end 60 of piston 58.

In order to supply air to the expansible chamber 61, air magnet valve assembly 34 is placed in communication with the expansible chamber 61 by means of a passage 94 located in the closed end 56 of cylinder 54. The air magnet valve assembly 36 is placed in communication with the expansible chamber 68 by means of a passage 96 in the wall of cylinder 54, an annular clearance 98 formed by the inner surface of cylinder 54 and a recess in the outer surface of cylinder 58, and a plurality of small passages 100 extending through the wall of cylinder 58 and directly communicating with the annular clearance 98 and the expansible chamber 68. To prevent excessive leakage from the annular clearance 98 along the inner surface of cylinder 54 and the outer surface of piston 58, a sealing piston ring 102 is provided in a groove in the outer wall of piston 58.

The cupped member 78 which, as has been described, is held in abutting relation with the open end of the piston 58 may be secured in any suitable manner such as by welds 104 to the inner surface of a skirt 106 formed on the open end of piston 58. Welding the cupped member 78 to the open end of piston 58 is not necessary, however, because cupped member 78 may be maintained in constant engagement with the open end of piston 58 by preloading the spring 84 so that the force exerted thereby will be greater than the opposite force exerted against the member 78 when operating pressure is applied to the outer surface of the closed end 66 of piston 64.

The operation of this servo and control means is as follows:

Assume all of the operating portions of this new control to be in the positions shown. As the switch 52 is moved to the S or Series position so as to connect the traction motors M1 and M2 across the generator in series relation, a bridge contact 108 will connect the energizing coil of magnet valve assembly 34 across the battery BAT causing the valve 42 to become unseated so that air under pressure can flow from the air pressure source through the piping 40 and 38, the valve assembly 34, and passage 94 into the expansible chamber 61. By applying pressure to the chamber 61 against the outer surface of the closed end 60 of the piston 58, the piston will be moved to the right, as viewed in the diagram, against the biasing spring 84, compressing this spring. The piston 58 will continue to move to the right until a surface 110 on the open end of piston 58 abuts a surface 112 on the cover plate 72. Movement of the piston 58 to the right will, of course, also move the piston 64 and the operating rod 88 to the right to a position determined by when surfaces 110 and 112 abut each other. Movement of the operating rod 88 to this first predetermined position causes the rack 30 to turn the pinion 28, shaft 22, and drum 20 so that lobe 16 actuates the link 10 to close the contacts 4. Closure of contacts 4 connects the motors M1 and M2 in series across the generator G and the locomotive will therefore begin to accelerate. As the locomotive accelerates and the traction motors M1 and M2 do likewise, the back voltage thereof will increase until a point is reached where no further acceleration of the locomotive is possible. When this condition is reached the switch 52 may be moved further to the right to the P or Parallel position. Movement of the switch 52 to its parallel position will maintain magnet valve 34 energized and also energizes magnet valve 36. Energization of magnet valve 36 will enable air under pressure to be supplied therethrough to the expansible chamber 68 by means of passage 96, annular clearance 98, and passages 100.

Since the outer surface area of the closed end 66 of piston 64 is less than the outer surface area of closed end 60 of piston 58, piston 58 will remain in its operating position with surfaces 110 and 112 and abutment and piston 64 will move to the right, as viewed in the drawing, until a surface 114 thereof abuts the lip 80 of cupped member 78. Movemement of the piston 64 to the right will, of course, cause the operating rod 88 to move further to the right to a new operating position. Movement of the operating rod 88 to the right will cause the rack 30 and pinion 28 to rotate drum 20 further in a counterclockwise direction so that lobe 16 no longer actuates the link 10 and the contacts 4 open to disconnect the motors M1 and M2.

In the new operating position, however, the lobes 14 and 18 will engage the links 8 and 12, respectively, to close the contacts 2 and 6. Closure of contacts 2 and 6, it will be observed, connects the motors M1 and M2 in parallel across the generator G.

If it is desired to add additional steps to the transition control, such as first shunting the motor fields before connecting the motors in parallel and shunting the motor fields after the motors have been connected in parallel across the main generator, it would be necessary to add an additional piston for each new operating position, an air magnet valve to supply an additional expansible chamber, and an additional biasing spring. It will thus be seen that any number of steps can be added to this servomotor to accommodate the number of operating positions desired. For this reason such a servomotor has a great utility in the type of installation just described. This is particularly true for another reason which is that the servomotor will take up its operating positions and maintain them even if there is a substantial amount of leakage in the air pressure system. This may be quickly appreciated when one realizes that the servomotor does not rely on critical pressures to hold its pistons in their operating positions, but rather a pressure-spring differential which can vary over a moderately wide range.

The servomotor is of the simplest possible construction. It will be noted, however, that the parts are so arranged as to form spring guides for the spring ends so that the springs cannot become dislodged, injured, or rendered inoperable in any way.

A further advantage in using this type of servomotor control, as described, lies in the fact that should a certain amount of bounce take place between the surfaces 110 and 112 and the surface 114 and the lip 80, this bounce will not be transmitted to the contacts 2, 4, and 6. This may be appreciated by observing that the contacts 2, 4, and 6 are held in engagement with each other by the lobes 14, 16 and 18, respectively, and the surfaces of these lobes and the engaging portions of the links 8, 10, and 12 are of sufficient area to prevent disengagement therebetween except on very extensive movement of the operating rod 88 and rack 30.

It should also be emphasized that in describing the device magnet valve assembly 34 was first energized and then magnet valve 36 was energized. It is not necessary that the valves be energized in this order, however, and it should be readily appreciated that the servomotor would work equally well if magnet valve 36 was energized first.

I claim:

A servomotor comprising a hollow cylinder closed at one end thereof, a first hollow cylindrical piston in said cylinder and having a closed end forming an expansible chamber therewith, a second hollow cylindrical piston in said first hollow cylindrical piston and having a closed end forming a second expansible chamber therewith, a detachable cover plate for the other end of said cylinder having a central opening therein, said cover plate having a spring seat facing the closed end of said cylinder, a circular cupped member abutting the open end of said first piston, said cupped member having a lip on the rim thereof and a central opening in the bottom thereof, the underside of said lip forming a spring seat facing said cover plate, the inner surface of the bottom of said cupped member forming a spring seat around said central opening facing the closed end of said cylinder, a helical coil spring in said cylinder having an end engaging the spring seat on said detachable cover plate and an opposite end engaging the spring seat formed by the underside of said lip, said spring normally urging the closed end of said first piston against the closed end of said cylinder, an operating rod extending into said cylinder and said pistons through said central openings, said rod having a flange thereon adjacent the inner surface of the closed end of said second piston, a second helical coil spring having an end seated on said spring seat formed by the inner bottom surface of said cupped member and an opposite end seated on said flange, said second spring normally urging said flange against the closed end of said second piston and the closed end of said second piston against the closed end of said first piston, and abuttable surfaces on the open end of said first cylinder and said cover plate forming a stop to limit travel of said first piston and operating rod relative to said cylinder in response to pressure applied to said first expansible chamber, second abuttable surfaces on the open end of said second cylinder and the upper side of said lip to limit travel of said second piston and operating rod relative to said first piston in response to pressure applied to said second expansible chamber, and selector valve means adapted to be connected to a pressure source and in communication with said chambers, said valve means having a plurality of operating positions to apply pressures to said chambers in different combinations.

References Cited in the file of this patent

UNITED STATES PATENTS

| | | |
|---|---|---|
| 1,231,257 | Herr | June 26, 1917 |
| 1,263,373 | Case | Apr. 23, 1918 |
| 1,360,745 | Hellmund | Nov. 30, 1920 |
| 2,352,212 | Lang | June 27, 1944 |
| 2,510,314 | Jirsa | June 6, 1950 |

FOREIGN PATENTS

| | | |
|---|---|---|
| 163,735 | Switzerland | Nov. 1, 1933 |
| 993,143 | France | July 18, 1953 |